(12) United States Patent
Bondalapati et al.

(10) Patent No.: US 10,007,700 B2
(45) Date of Patent: Jun. 26, 2018

(54) QUERY OPTIMIZATION FOR GROUP-BY EXTENSIONS AND DISTINCT AGGREGATE FUNCTIONS

(71) Applicant: Oracle International Corporation, Redwood Shores, CA (US)

(72) Inventors: Srikanth Bondalapati, Belmont, CA (US); Sankar Subramanian, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 276 days.

(21) Appl. No.: 14/753,590

(22) Filed: Jun. 29, 2015

(65) Prior Publication Data

US 2016/0378827 A1    Dec. 29, 2016

(51) Int. Cl.
 *G06F 17/30* (2006.01)
(52) U.S. Cl.
 CPC .. *G06F 17/30463* (2013.01); *G06F 17/30412* (2013.01); *G06F 17/30489* (2013.01); *G06F 17/30454* (2013.01)
(58) Field of Classification Search
 CPC ......... G06F 17/30489; G06F 17/30315; G06F 17/30412; G06F 17/30442; G06F 17/30454; G06F 17/30595; G06F 17/30867; Y10S 707/99933
 See application file for complete search history.

(56) References Cited

U.S. PATENT DOCUMENTS

| | | | |
|---|---|---|---|
| 5,469,568 A | 11/1995 | Schiefer et al. | |
| 5,832,475 A * | 11/1998 | Agrawal | ........... G06F 17/30489 |
| 5,943,666 A | 8/1999 | Kleewein et al. | |
| 6,298,342 B1 | 10/2001 | Graefe et al. | |
| 6,341,281 B1 | 1/2002 | MacNicol et al. | |
| 6,345,267 B1 | 2/2002 | Lohman et al. | |
| 6,430,550 B1 * | 8/2002 | Leo | ................... G06F 17/30445 707/623 |

(Continued)

OTHER PUBLICATIONS

HP Vertica Analytics Platform Version 5.1.x Documentation, dated Oct. 16, 2013, 1 page. https://my.vertica.com/docs/5.1.6/HTML/index.htm#19967.htm.

(Continued)

*Primary Examiner* — Kris Mackes
*Assistant Examiner* — Merilyn Nguyen
(74) *Attorney, Agent, or Firm* — Hickman Palermo Becker Bingham LLP

(57) ABSTRACT

Techniques for query optimization for group-by extensions and distinct aggregate functions are provided. A query has an extended group-by clause with an extended group-by operator and a first set of group-by columns. The query has one or more distinct aggregate functions and one or more non-distinct aggregate functions. An initial subquery is constructed that generates a partially aggregated initial temporary (PAIT) table when executed. The initial subquery includes a GROUP BY clause with a second set of group-by columns that includes the first set of group-by columns of the extended group-by clause of the query and one or more columns specified by the one or more distinct aggregate functions. One or more subqueries are computed that compute groupings indicated by the extended group-by operator based on the PAIT table generated by the initial subquery.

24 Claims, 2 Drawing Sheets

(56) References Cited

U.S. PATENT DOCUMENTS

| | | | |
|---|---|---|---|
| 6,574,623 B1 * | 6/2003 | Leung | G06F 17/30454 |
| 6,775,681 B1 * | 8/2004 | Ballamkonda | G06F 17/30454 |
| | | | 707/718 |
| 6,775,682 B1 * | 8/2004 | Ballamkonda | G06F 17/30489 |
| 7,725,455 B1 * | 5/2010 | Shatdal | G06F 17/30489 |
| | | | 707/713 |
| 8,712,993 B1 * | 4/2014 | Ordonez | G06F 17/30489 |
| | | | 707/713 |
| 9,183,254 B1 * | 11/2015 | Cole | G06F 17/30339 |
| 9,720,967 B2 * | 8/2017 | Lee | G06F 17/30466 |
| 2003/0208484 A1 | 11/2003 | Chang et al. | |
| 2014/0372411 A1 * | 12/2014 | Attaluri | G06F 17/30979 |
| | | | 707/722 |
| 2015/0293968 A1 * | 10/2015 | Dickie | G06F 17/30412 |
| | | | 707/738 |

OTHER PUBLICATIONS

Ben-Gan, Itzik, "Optimizing Aggregates with Distinct", dated May 27, 2009, SQL Server Content from SQL Server Pro, http://sqlmag.com/sql-server/optimizing-aggregates-distinct, 3 pages.

TAJO-601: Improve Distinct Aggregation Query Processing, dated Feb. 18, 2014, https://reviews.apache.org/r/18210/, 2 pages.

\* cited by examiner

QUERY OPTIMIZATION FOR GROUP-BY EXTENSIONS AND DISTINCT AGGREGATE FUNCTIONS

FIELD OF THE INVENTION

The present invention relates to database systems and, in particular, to optimization of queries executed by a database system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Relational and object-relational database management systems store information in a database. To retrieve data, queries are submitted to a database server, which computes the queries and returns the data requested. Query statements submitted to the database server should conform to the syntactical rules of a particular query language. One popular query language, known as the Structured Query Language (SQL), provides users a variety of ways to specify information to be retrieved. A query submitted to a database server is evaluated by a query optimizer. Based on the evaluation, the query optimizer generates an execution plan that is optimized for efficient execution. The optimized execution plan may be based on a rewrite of the query into a semantically equivalent but more efficient form.

Aggregate Functions

An important function performed by a database management system is the generation of aggregated information by applying an aggregate function to the values in a specified column of one or more rows in a table. Examples of aggregate functions are SUM( ), COUNT( ), AVERAGE( ), MIN( ) and MAX( ). For example, in an OLAP (on-line analytical processing) environment or a data warehousing environment, data is often organized into a star schema. A star schema is distinguished by the presence of one or more relatively large fact tables and several relatively smaller dimension tables. Rather than duplicating the information contained in different tables, foreign key values in foreign key columns of the fact table relate to the primary key of the dimension tables. A JOIN operation can produce rows that are created by combining rows from these different tables.

When an aggregate function is in a query that has a group-by clause, then (a) the set of all rows that satisfy the query are divided into subsets, and (b) the aggregate function is applied separately to each subset. Thus, the number of aggregate values produced by the query will typically be the number of sub-sets created by the group-by clause. The number of subsets created by the group-by clause is typically determined by the number of distinct values in columns specified in the group-by clause of the query. Such columns are referred to hereafter as "group-by columns".

The result set of a query is often presented in the form of table, although no persistent table is actually created in the database. In the result set of a query that contain an aggregate function, the values produced by the aggregate function are presented in an "aggregated column" of the result set table. Example query Q1 is provided as an illustration.

EXAMPLE QUERY Q1

SELECT d, SUM(s)
FROM t
GROUP BY d

Assume table t contains data representing the sales of an organization. Each row represents a particular sales transaction. For a particular row in table t, column d contains the date of the sales transaction, and column s contains the sale amount. The SELECT clause contains "SUM(s)", which specifies that the aggregate function SUM is applied to values in column s. The query also includes the GROUP BY clause "GROUP BY d", which denotes column d as the group-by column. Execution of example query Q1 generates a result set with a column for d and a column for SUM(s). Thus, each row in the result set includes a particular date and the sum of sales for all sale transactions on the particular date.

Distinct Aggregate Functions

As noted above, an aggregate function returns a value based on the aggregation of the values in a specified column for a set of one or more rows. An aggregate function may be a distinct aggregate function. The value returned by a distinct aggregate function is based on the aggregation of distinct values in the specified column within the set of one or more rows. For example, even if the value "1" appears multiple times in the specified column of a set of rows, the aggregate function should only be applied to the value "1" once. For example, the COUNT aggregate function will return a count of the number of entries in the column in the subset of rows, while a DISTINCT COUNT function will return the number of distinct entries in the column. The DISTINCT COUNT of the set of values {1, 1, 1, 3} is 2, while the COUNT of the same set of values is 4. As a second example, the DISTINCT AVERAGE of the set of values {1, 1, 1, 3} is 2, while the AVERAGE of the same set of values is 1.5. Typically, for non-distinct aggregate functions, a single pass over the set of data to which the aggregate function is being applied is sufficient to calculate the aggregate value. Further, such aggregation operations can be processed in a distributed manner without retaining data. However, to properly execute distinct aggregate functions, data may need to be retained to distinguish the occurrence of unique values. For example, if rows from a first set are aggregated into a first intermediate set and rows from a second set are aggregated into a second intermediate set based on a particular column without retaining the distinct values of the particular column, a distinct result cannot be guaranteed to be correct when further aggregation of the first result set and the second result set into a final aggregated set is performed.

GROUP BY Operator

GROUP BY clauses are typically used in conjunction with aggregate functions. A GROUP BY clause, when used with an aggregate function, generates aggregated results for the subsets specified by the GROUP BY clause. In example query Q1, "GROUP BY d" causes the aggregate function SUM(s) to be performed on sales transactions that are grouped by date. Such aggregated sales are generated for each unique date value.

It is often useful to generate aggregate information grouped by multiple group-by columns. For example, table t may also contain column r, a column containing values representing regions. It may be useful to generate a result set that summarizes sales by region, and for each region, sales date. Such a result set may be generated by referencing column r and d in the GROUP BY clause, as illustrated by example query Q2.

EXAMPLE QUERY Q2

SELECT d, r, SUM (s)
FROM t
GROUP BY r, d

"GROUP BY r, d" causes the aggregate function SUM(s) to be performed on sales transactions for each region and date. That is, a separate sum(s) value will be produced for each unique region/date combination.

ROLLUP Operator

A useful way to provide information is to generate one result set that groups data by various combinations of columns. For example, a result set may be desired that contains values aggregated by each region and date, as well as values aggregated only by region. Such a result set may be generated by submitting a query that includes multiple subqueries operated upon by the UNION ALL operator. While union queries may be used to generate a result set with multiple groupings, they can be very tedious to write. Furthermore, such queries are very inefficient to execute, as some tables are accessed multiple times. To avoid these issues, additional group-by operators are available to specify groupings that include various combinations of the columns specified as arguments to the operators. Such group-by operators are used heavily in data warehouses in creating and maintaining materialized views, and to answer ad-hoc analytical queries. Optimal execution of these operations is very critical for improving the query response time and for reducing the materialized view refresh windows.

Example query Q3 includes a ROLLUP operator:

EXAMPLE QUERY Q3

SELECT a, b, c, SUM(d)
FROM t
WHERE (predicate/s)
GROUP BY ROLLUP (a, b, c)

The above ROLLUP operator aggregates data across the group-by columns specified in the GROUP BY clause from right to left, as well as a grand total, for all rows that satisfy the specified predicate/s. Example query Q3 produces aggregated results on each combination of values for the following groups:
(a, b, c);
(a, b);
(a); and
( ),
where ( ) is the aggregated result for all the identified rows.

A ROLLUP operator is referred to as a partial ROLLUP operator that operates on a subset of the group-by columns specified in the GROUP BY clause. Example query Q4 includes a partial ROLLUP operator:

EXAMPLE QUERY Q4

SELECT a, b, c, d, SUM(e)
FROM t
WHERE (predicate/s)
GROUP BY a, ROLLUP (c, b)

The "ROLLUP (c, b)" portion indicates the sets (c, b); (c); and ( ), which are each grouped with "a". One advantage of the ROLLUP operator is that non-distinct aggregate values can be computed based on a higher level of groupings, while distinct aggregate values can be easily computed without reordering the underlying data. Thus, example query Q4 produces aggregated results on each combination of values for the following groups:
(a, c, b);
(a, c); and
(a).

Extended GROUP-BY Operators

As used herein, the term "simple group-by" refers to the GROUP BY clauses with or without a ROLLUP operator, while the term "extended group-by" refers to operators that specify more complex groupings, such as the CUBE operator and the GROUPING SETS operators. Example query Q5 includes the CUBE operator:

EXAMPLE QUERY Q5

SELECT a, b, c, SUM(d)
FROM t
WHERE (predicate/s)
GROUP BY CUBE (a, b, c)

The CUBE operator aggregates data across all combination of the keys (or columns) specified in the GROUP BY clause from right to left, as well as a total, for all rows that satisfy the specified predicate/s. Example query Q5 produces aggregated results on each combination of values for the following groups:
(a, b, c);
(a, b);
(b, c);
(a, c);
(a);
(b);
(c); and
( ).

The GROUPING SETS operator allows the specific independent groupings to be specified. The GROUPING SETS operator produces a single result set which is equivalent to a UNION ALL of differently grouped rows, but at a significantly reduced computational cost. Furthermore, the GROUPING SETS operator is more efficient than other grouping operators (e.g., CUBE or ROLLUP) because it specifies computation of only the groups of interest, thus avoiding unnecessary computation. Example query Q5 includes the GROUPING SETS operator:

EXAMPLE QUERY Q6

SELECT a, b, c, SUM(d)
FROM t
WHERE (predicate/s)
GROUP BY GROUPING SETS ((a, c), (b, c), (b))

Example query Q6 generates results with data aggregated over each combination of values for the specified GROUPING SETS.

Evaluation of Extended GROUP BY Operators

The evaluation of grouping sets indicated by extended group-by operators can be reduced to a set of one or more simple GROUP BY clauses with or without a ROLLUP operator. It is more efficient to group two or more indicated sets as a ROLLUP operator since the sets of a ROLLUP operator can be computed using one or more common sorting operations of the underlying data. U.S. Pat. No. 6,775,681 describes one method of optimization for queries that include the GROUPING SETS operator. However, this optimization method still requires a large amount of temporary data to be generated and stored.

Many optimizations for executing aggregate functions are limited to queries that contain only non-distinct aggregate functions, or queries that contain only a single distinct aggregate function. Implementation of extended group-by operators can additionally benefit from more efficient computational techniques, particularly when distinct aggregate functions are involved. Based on the foregoing, it is desirable to provide query optimization for extended group-by operators and distinct aggregate functions.

DETAILED DESCRIPTION

Figure 1:
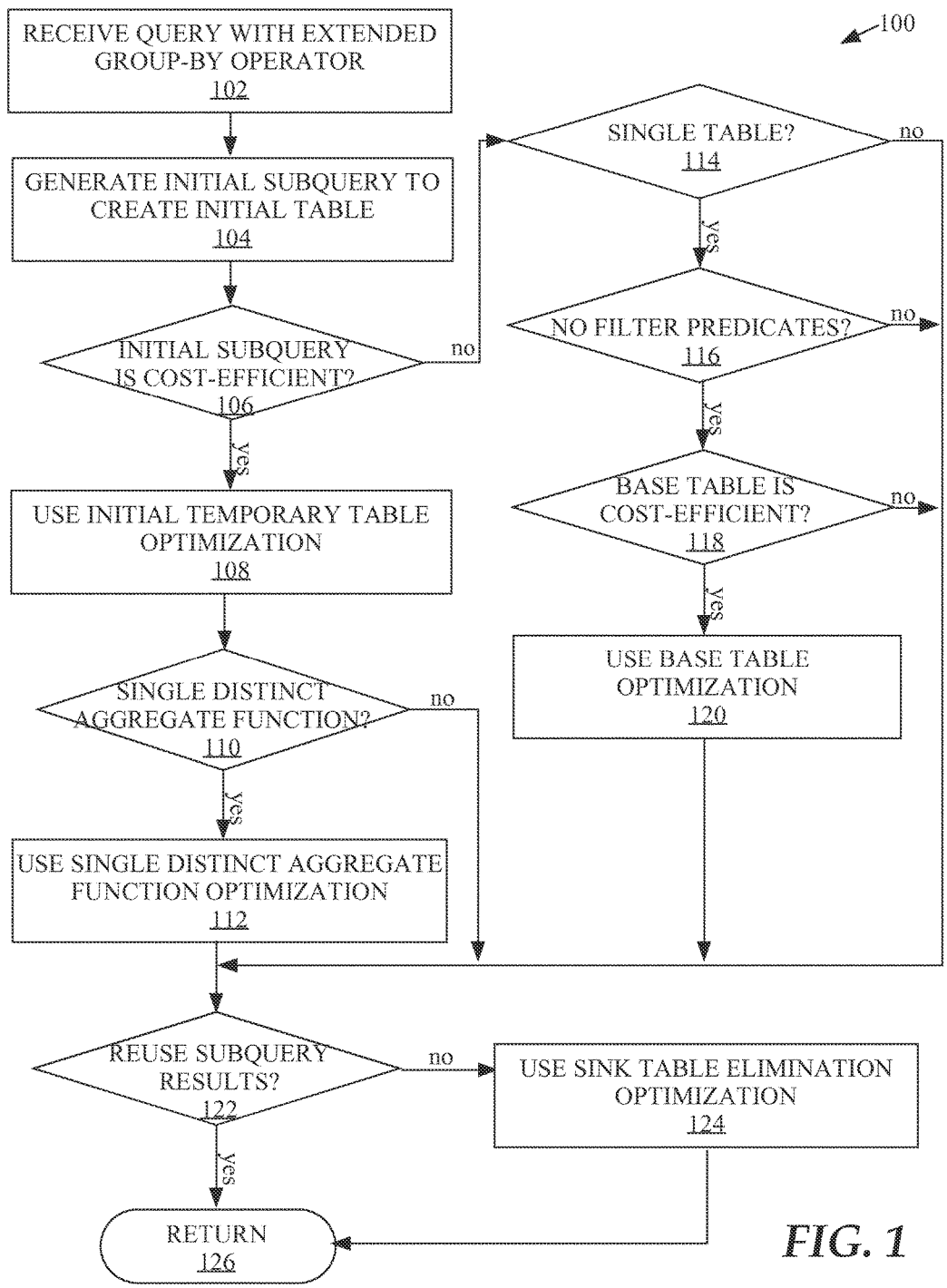
FIG. 1 is a flow diagram that illustrates an embodiment for query optimization for queries with extended group-by operators using one or more techniques.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for distinct aggregate query optimization for extended group-by operators and distinct aggregate functions. When the conditions for the optimization techniques described herein are satisfied, a query may be transformed or otherwise rewritten using the respective technique/s to make the query more efficient to process. Thus, query execution time and other database resources are conserved. The following optimization techniques shall be described in greater detail hereafter:
  initial-partial-aggregation technique;
  direct-from-base-table technique;
  single-distinct-aggregate-exclusion technique; and
  sink-table-elimination technique.

As used herein, the term "aggregate function" refers to a function that returns a value based on the aggregation of the values in a column for one or more sets of rows; the term "distinct aggregate function" refers to an aggregate function that produces a value based on the aggregation of distinct values in a column for one or more sets of rows; and the term "non-distinct aggregate function" refers to an aggregate function that is not a distinct aggregate function.

Example Query Optimization Framework

The extended group-by optimizations described herein may be integrated into a query optimization framework that includes other extended group-by optimizations. U.S. Pat. No. 6,775,681, which is herein incorporated by reference in its entirety, includes examples of other extended group-by optimizations within a query optimization framework. The optimization techniques described herein may be implemented within such a query optimization framework or other query optimization frameworks, also referred to herein as an "underlying query optimization framework." The optimization techniques described herein may be used in conjunction with one or more extended group-by optimizations provided by the underlying query optimization framework.

Unaggregated Initial Temporary Tables

In an example underlying query optimization framework, an unaggregated initial temporary table (UIT table) is first generated. The UIT table includes the set of columns specified by the GROUP BY clause of the original query and contains the results of all the inner queries, and base tables of a query are joined, projected, and materialized.

Initial-Partial-Aggregation Technique—Queries that Include at Least One Distinct Aggregate Function, and at Lease One Non-Distinct Aggregate Function As described above, if needed, a query execution framework may generate an initial temporary table that includes all the data needed to compute a particular query, such as the UIT table, in order to perform the aggregate functions specified by the query. For example, the initial temporary table of an underlying query optimization framework may include the results of all the inner queries and base tables for the particular query, which may be joined, projected, and/or materialized.

In one embodiment, a query that includes at least one distinct aggregate function and at least one non-distinct aggregate function is processed using the initial-partial-aggregation technique. When the initial-partial-aggregation technique is used to process a query with one or more distinct aggregate functions and one or more non-distinct aggregate functions, a partially-aggregated initial temporary table ("PAIT table") is generated for the query. For example, in one embodiment, in response to receiving a particular query that matches the conditions for using the initial-partial-aggregation technique, the database server constructs and executes an initial subquery that generates the PAIT table corresponding to the particular query. The database server also constructs one or more subqueries to compute the result set for the particular query, including any aggregate functions and/or non-distinct aggregate functions, based on the PAIT table corresponding to the initial subquery. The initial subquery and the one or more subqueries are referred to as "internal queries" because they are constructed within the database server and used by the database server for the purpose of processing queries that are received.

The PAIT table includes aggregate values for all the non-distinct aggregate functions of the query, grouped by a set of one or more columns that includes: (a) the set of columns specified by the GROUP BY clause of the original query and (b) the column/s corresponding to all the distinct aggregate functions.

To generate the PAIT table, any non-distinct aggregate functions in the particular query are performed for a grouping that includes the group-by columns as well as the columns on which the distinct aggregate functions are performed. The PAIT table includes all the data necessary to compute the particular query, including the columns necessary to compute the one or more distinct aggregate functions. The addition, to the group-by columns, of the columns to which the distinct aggregate function is applied retains the distinct values contained in these columns. The performance of the non-distinct aggregate functions generates a smaller PAIT table than a UIT table or other initial temporary table of an underlying query optimization framework.

The initial-partial-aggregation technique may be used for queries that include one or more distinct aggregate functions, and is still valid when the query includes multiple distinct aggregate functions, such as example query Q7:

EXAMPLE QUERY Q7

SELECT ename, deptno, nvl(mgr, 0), count(distinct sal),
　　count(distinct title), sum(comm), count(comm)
FROM scott.emp
GROUP BY cube(ename, deptno, mgr);

NVL( ) is a function that replaces a null value. Query Q7 also includes two distinct aggregate functions, COUNT (distinct sal) and COUNT(distinct title), and two non-distinct aggregate functions.

In an underlying query optimization framework, the UIT table would be generated using an initial subquery as described in subquery Q7':
Subquery Q7':
SELECT s1.ename c0, s1.deptno c1, s1.mgr c2, s1.sal a0,
　　s1.title a1, s1.comm a2,
FROM scott.emp s1;

Thus, the UIT table, generated without the initial-partial-aggregation technique, would include data for the columns ENAME, DEPTNO, MGR, SAL, TITLE and COMM of the table SCOTT.EMP, and would have rows corresponding to the original rows of the table SCOTT.EMP; no aggregation is performed on these original rows.

On the other hand, when the initial-partial-aggregation technique is used, a PAIT table is generated that includes computed non-distinct aggregate values on the query over a simple GROUP BY clause that includes all the group-by columns of example query Q7 (ename, deptno, mgr), as well as the columns on which the distinct aggregate functions are performed (sal, title), as indicated in subquery Q7":
Subquery Q7":
SELECT s1.ename c0, s1.deptno c1, s1.mgr c2, count
　　(s1.comm) a0, sum(s1.comm) a1, s1.sal a2,
s1.title a2
FROM scott.emp s1
GROUP BY s1.ename, s1.deptno, s1.mgr, s1.sal, s1.title;

The subquery Q7" generates aggregate values to compute non-distinct aggregate functions included in the query. Thus, a value would be included for each combination of the columns specified by the GROUP BY clause (i.e. the group-by column/s specified in the original query and the column/s corresponding to the distinct aggregate functions). Although example query Q7 includes two distinct aggregate functions, a query may include one distinct aggregate function.

By populating the PAIT table with rows that correspond to the specified groupings including the group-by columns and the distinct aggregate columns, potentially less rows are stored in the PAIT table than in the UIT table of the underlying query execution framework. A smaller PAIT table reduces the risk of running out of memory when processing large database relations. Furthermore, a smaller PAIT table reduces the processing time to perform sorting, reading and writing operations from the PAIT table for further aggregate processing.

Once the PAIT table has been generated, internal queries are constructed that determine the result set for the original query based on the PAIT table. How internal queries make use of the PAIT table shall be described in greater detail hereafter.

The PAIT table is necessarily smaller than the UIT table that would have been generated if the results of all the inner queries, and base tables of a query are joined, projected, and materialized. Thus, the PAIT table uses less space, and future operations on the PAIT table require less processing.

In one embodiment, when the query includes one or more predicates specified in a WHERE clause, the initial subquery is constructed to generate the PAIT table such that the one or more predicates are applied to filter the rows added to the PAIT table.

Cost-Based Query Optimization for Initial-Partial-Aggregation Technique

In one embodiment, the initial-partial-aggregation technique is only used to execute the query when it is determined that using the initial-partial-aggregation technique is cost effective, such as based on one or more cost estimates. For example, the initial-partial-aggregation technique can be used when the estimated cost of using the PAIT table generated by the initial-partial-aggregation technique is lower than a cost of using another initial temporary table, such as the UIT table.

When the conditions for using the initial-partial-aggregation technique are met, an estimated cost of using another technique defined in the underlying query optimization framework for generating an initial base table for a query can be compared against an estimated cost of using the initial-partial-aggregation technique on the query. Even if the conditions for the initial-partial-aggregation technique are met, a cost optimizing procedure may determine that another technique defined in the underlying query optimization framework for generating an initial base table should be used.

In one embodiment, the cost estimates are generated by compiling the subqueries for generating the initial temporary table to determine and/or estimate the size (e.g. the number of rows) that would be produced in (1) the PAIT table using the initial-partial-aggregation technique and (2) an initial temporary table that would otherwise be created using the underlying query execution framework, such as a UIT table. In one embodiment, the determination of whether to use the initial-partial-aggregation technique is based on a metric that includes the estimated size for a UIT table (or other initial table defined in the underlying query optimization framework) (N1) divided by the estimated size for the PAIT table (N2), or (N1/N2). One example of a metric is N1/N2, which reflects a relative size reduction of the initial temporary table when the initial temporary table is a PAIT table generated using the initial-partial-aggregation technique. In one embodiment, the metric is further based on a degree of parallelism (Dr) available to compute the query. For example, the metric may be N1/N2/DP. In one embodiment, the initial-partial-aggregation technique is used when the metric is greater than a threshold T. Any of the values used in cost optimization may be estimated.

Direct-From-Base-Table Technique

In the direct-from-base-table technique, an additional optimization may be performed for queries containing extended group-by operators and distinct aggregate functions when the query meets certain criteria: (1) the FROM clause only includes one table, and does not require any joins or views; and (2) there are no predicates specified in the WHERE clause. When these criteria are met, creation of the PAIT table can be bypassed. Instead, the base table, i.e. the table specified in the FROM clause of the query, can be accessed directly for computing the groupings.

Cost-Based Query Optimization for Direct-From-Base-Table Technique

In one embodiment, the direct-from-base-table technique is only used to execute the query when it is determined, such as based on one or more cost estimates, that the direct-from-base-table technique will likely incur a lower cost. For example, when the direct-from-base-table technique conditions are met, an estimated cost of using another technique defined in the underlying query optimization framework for generating an initial temporary table (e.g. a UIT table) for a query can be compared against an estimated cost of using the direct-from-base-table technique on the query. Even if the conditions for the direct-from-base-table technique are met, a cost optimizing procedure may determine that another technique defined in the underlying query optimization framework for generating an initial base table should be used.

In one embodiment, the cost estimates are based on the number of times the initial temporary table would be accessed when computing additional subqueries (N). With respect to cost estimates for the direct-from-base-table technique, the cost of using another technique defined in the underlying query optimization framework for generating an initial base table (C1) is based on an initial cost of reading from the base table ($C_i(R_{BT})$), an initial cost of writing to the UIT table or other initial temporary table of the underlying query optimization framework ($C_i(W_{TTi})$), the number of times the UIT table would be accessed (N), and a cost of reading from the UIT table ($C(R_{TTi})$). In one embodiment, $C1=C_i(R_{BT})+C_i(W_{TTi})+N*C(R_{TTi})$. With respect to cost estimates for the direct-from-base-table technique, the cost of using the direct-from-base-table technique (C2) is based on a number of times the table used would be accessed (N), and a cost of reading from the base table ($C(R_{BT})$). In one embodiment, $C2=N*C(R_{BT})$. Any of the values used in cost optimization may be estimated.

Single-Distinct-Aggregate-Exclusion Technique

The single-distinct-aggregate-exclusion technique may be used in conjunction with the initial-partial-aggregation technique. When the original query includes a CUBE or GROUPING SETS clause and includes only one distinct aggregate function, then the DISTINCT operator can be excluded from subsequent internal queries used for populating data into subsequent temporary tables. For example, a DISTINCT COUNT aggregate function in a subquery can be rewritten as a COUNT function. Example query Q8 only contains one distinct aggregate function:

EXAMPLE QUERY Q8

SELECT ename, deptno, mgr, count(distinct sal), sum (comm), count(comm)
FROM scott.emp
GROUP BY cube(ename, deptno, mgr);

Example query Q8 includes one distinct aggregate function, COUNT(distinct sal), and two non-distinct aggregate functions.

Using the initial-partial-aggregation technique discussed herein, the PAIT table for query Q8 would be generated as indicated in subquery Q8':
Subquery Q8':
SELECT s1.ename c0, s1.deptno c1, s1.mgr c2, count (s1.comm) a0, sum(s1.comm) a1, s1.sal a2
FROM scott.emp s1
GROUP BY s1.ename, s1.deptno, s1.mgr, s1.sal;

Subsequently, subquery Q8", described below, would be executed against the PAIT table to generate a set of groupings that would appear in the result set for the query. Subquery Q8" includes SQL commands to manipulate and format data.
Subquery Q8":
SELECT c0, c1, c2, bin_to_num(grouping(c0), grouping (c1), grouping(c2)) d0, sum(a0), sum(a1), count(distinct a2)
FROM sys_temp1
GROUP BY (c0, c1, c2);

However, when the single-distinct-aggregate-exclusion technique is used, subquery Q8''' provides another option in place of subquery Q8", and does not include the column corresponding to the distinct aggregate operation among the internal queries used for populating data into the subsequent temporary tables.
Subquery Q8''':
SELECT c0, c1, c2, bin_to_num(grouping(c0), grouping (c1), grouping(c2)) d0, sum(a0),
sum(a1), count(a2)
FROM sys_temp1
GROUP BY (c0, c1, c2);

The single-distinct-aggregate-exclusion technique produces the correct result because the PAIT table produced by subquery Q8' already contains, for each distinct value in the column "sal", a row with the aggregated values for the non-distinct aggregate functions.

Reducing Queries that have the Cube Operator or Grouping Set Operator In The GROUP-BY Clause An underlying query optimization framework reduce queries comprising the GROUPING SETS operator or the CUBE operator into one or more simple GROUP BY clauses with or without a rollup operator. That is, the GROUPING SETS operator and/or CUBE operator is reduced to one or more combination of groupings that are computable with (i) a simple GROUP BY clause; or (ii) a GROUP BY clause with a rollup operator.

Simple GROUP BY clauses without rollup operators and GROUP BY clauses with rollup operators are efficient operations. This primarily results from the fact that these operations can be computed with a single sort of the data in order to logically group the records for efficient grouping and aggregation purposes. For example, the clause "GROUP BY GROUPING SETS ((a, b, c, d), (a, b, c), (a, b))" can be evaluated with a single sort by converting it to "GROUP BY a, b, rollup(c, d)" which generates the same specified groupings as would the GROUPING SETS operator. A GROUPING SETS operator, when reduced, may require more than one GROUP BY clause, in which case the results of each clause are combined, such as by using a UNION ALL command.

GROUPING SETS operators can often be reduced in more than one way. For example, the grouping set "GROUP BY GROUPING SETS ((a, b, c, d), (a, b, c), (a, b), (a, c), (c, d), (c), (a))" can be reduced as:
  G1: GROUP BY a, b, rollup(c, d), which produces (a, b, c, d), (a, b, c), and (a, b);
  G2: GROUP BY a, rollup(c), which produces (a, c) and (a); and
  G3: GROUP BY c, rollup(d), which produces (c, d) and (c);
with the results from G1-G3 combined with a UNION ALL (or similar) command.

The same grouping set can also be reduced as:
  G4: GROUP BY c, rollup(d, (a, b)), which produces (a, b, c, d), (c, d), and (c);
  G5: GROUP BY a, rollup(c, b), which produces (a, b, c), (a, c), and (a); and
  G6: GROUP BY a, b, which produces (a, b);
with the results from G4-G6 combined with a UNION ALL (or similar) command.

Storing Internal Query Results

A further cost reduction technique involves determining whether a grouping can be computed from another grouping. For example, group G2, which references columns a and c, can be computed from groupings (a, b, c, d) or (a, b, c).

Employing this type of heuristic process yields an evaluation of the exemplary groupings as follows:

(a) compute G1, including groupings (a, b, c) and (a, b, c, d);

(b) compute G2 from grouping (a, b, c) of G1;

(c) compute G3 from grouping (a, b, c, d) of G1.

One or more temporary tables are used to store records that are generated from a previously computed grouping. For example, when it is determined that a second simple GROUP BY clause may be computed from the results of a first simple GROUP BY clause, the results of the first simple GROUP BY clause are stored in an additional temporary table. Additional temporary tables are used for storage, retrieval and computation of subsequent groupings.

For example, if G2 (i.e., GROUP BY a, rollup(c)) is computed from grouping (a, b, c) of G1, then the result records of grouping (a, b, c) are stored in temporary table t1. Hence, the records can be retrieved from table t1 and used to compute the groupings produced by computation of the G2 operations. Similarly, result records of grouping (a, b, c, d), computed by G1 (i.e., GROUP BY a, b, rollup(c, d)), are stored in another temporary table t2, for use in computing the groupings produced by computation of the G3 operations. Records associated with groupings that are not used to compute subsequent groupings can all be stored in a single "sink" temporary table t3, for combination with the other temporary tables as part of the final stage of the query evaluation process.

Sink-Table-Elimination Technique

As described above, in some query optimization frameworks, when groupings specified in a query are reduced to simple GROUP BY clauses with or without a ROLLUP operator, and subqueries may be constructed based on the reduction. Furthermore, when the results of a first subquery can be used to compute another subquery, the results of the first subquery may be stored in an additional temporary table. Results of subqueries that are not reused are written to a table, referred to as a sink table.

In the sink-table-elimination technique, when results of a subquery are not reused, instead of storing the subquery results in a sink table, the results of the subqueries are union-ed and returned directly. With the sink-table-elimination technique, I/O writes into the sink table and I/O reads from the sink table can be avoided.

Example Process for Query Optimization

FIG. 1 is a flow diagram that illustrates an embodiment of a process for query optimization for queries with group-by extensions using one or more optimization techniques described herein. Process 100 may be performed by one or more computing devices and/or processes thereof. For example, one or more blocks of process 100 may be performed by computer system 200. In one embodiment, one or more blocks of process 100 are performed by a database server.

At block 102, a query is received. The query includes an extended group-by clause with an extended group-by operator and a first set of group-by columns.

At block 104, an initial subquery is constructed that generates a PAIT table when executed. The initial subquery includes a GROUP BY clause that includes a second set of group-by columns that specifies both the first set of group-by columns of the original query as well as one or more columns specified by one or more distinct aggregate functions of the query.

At decision block 106, it is determined whether the initial subquery is cost-efficient to use for generating a PAIT table to compute the query. For example, the cost of using the initial subquery to create an PAIT table to compute the query may be compared against the cost of using another solution, such as a solution in an existing query execution framework. If it is determined that the initial subquery is cost-efficient, processing continues to block 108. Otherwise, processing continues to decision block 114. At block 108, the initial-partial-aggregation technique selected for use to generate the base table from which the query will be computed.

At decision block 110, it is determined whether the query only includes a single distinct aggregate function. If the query only includes a single distinct aggregate function, processing continues to block 112, where the single-distinct-aggregate-exclusion technique is selected for use. In this case, when one or more subqueries to compute the groupings of the query are generated, the one or more subqueries are constructed to include an equivalent non-distinct aggregate function rather than the single distinct aggregate function. The use of the single distinct aggregate function only occurs if the initial-partial-aggregation technique (and corresponding PAIT table) is also used, as shown at block 108.

Returning to decision block 110, if it is determined that the query does not only include a single distinct aggregate function, processing continues to decision block 122 without selecting the single-distinct-aggregate-function technique for use.

Returning to decision block 106, if it is determined that initial subquery is not cost-efficient, processing continues to block 114. At this point, it has been determined that the initial-partial-aggregation technique (and corresponding PAIT table) will not be used. Decision blocks 114-118 determine whether the conditions for using the direct-from-base-table technique are met.

At decision block 114, it is determined whether the FROM clause of the query includes only a single table and does not require any joins or views. If the determination at decision block 114 is true, process 100 continues to decision block 116. Otherwise, process 100 continues to decision block 122. In one embodiment, when processing continues to decision block 122 from decision block 114, the query is computed using from an initial table constructed by an existing query execution framework.

At decision block 116, it is determined whether the query does not comprise any predicates in a WHERE clause. If the determination at decision block 116 is true, process 100 continues to block 118. Otherwise, processing continues to decision block 122. In one embodiment, when processing continues to decision block 122 from decision block 116, the query is computed using from an initial table constructed by an existing query execution framework.

At decision block 118, it is determined whether it is cost-efficient to use the single base table to compute the query. At this point, the conditions for using the direct-from-base-table technique are met, as determined at decision blocks 114-116. The cost of using the base table to compute the query may be compared against the cost of using another solution, such as a solution in an existing query execution framework. If it is determined that the base table is cost-efficient, processing continues to block 120. Otherwise, processing continues to decision block 122. At block 120, the direct-from-base-table technique is selected, and the single base table in the query is used to compute the query.

At decision block 122, it is determined whether subquery results for any of the one or more subqueries are reusable to calculate another subquery. If any subquery results are reusable, processing continues to block 126. Otherwise, processing continues to block 124, where the sink-table-elimination technique is selected for use. In this case, the optimized query will include a union of the results of the one or more subqueries that is performed without writing the results to any additional temporary table.

At block 126, method returns and/or terminates. For example, processing may continue to executing the current query, processing a successive query, passing control to a calling process, generating any appropriate record or notification, returning after a method or function invocation, or terminating.

The generation of the subqueries is not shown in process 100. In one embodiment, the subqueries to compute the groupings are generated and modified at various steps of process 100 based on the selection of optimization techniques to implement.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is an example language for querying database objects. As used herein, the term "query" is used to refer to any form of representing a query, including a query in the form of a database statement and any data structure used for internal query representation.

The query execution may perform operations on data from the source data object(s) on a row-by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement. The internal query representation may be in the form of a graph of nodes, each interlinked data structure corresponding to a node and to a component of the represented query statement. The internal representation is typically generated in memory for evaluation, manipulation, and transformation.

Query Optimization

As used herein, a query is considered "transformed" when the query is (a) rewritten from a first expression or representation to a second expression or representation, (b) received in a manner that specifies or indicates a first set of operations, such as a first expression, representation, or execution plan, and executed using a second set of operations, such as the operations specified by or indicated by a second expression, representation, or execution plan, or (c) received in a manner that specifies or indicates a first set of operations, and planned for execution using a second set of operations.

Two queries or execution plans may be semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by that query or execution plan, if executed.

A query optimizer may optimize a query by transforming the query. In general, transforming a query involves rewriting a query into another semantically equivalent query that can potentially be executed more efficiently, i.e. one for which a potentially more efficient and/or less costly execution plan can be generated. Both human-generated and software-generated queries may be rewritten more efficiently. A query may be rewritten by manipulating any internal representation of the query, including any copy thereof, to form a transformed query or a transformed query representation. Alternatively and/or in addition, a query may be rewritten by generating a different but semantically equivalent database statement.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
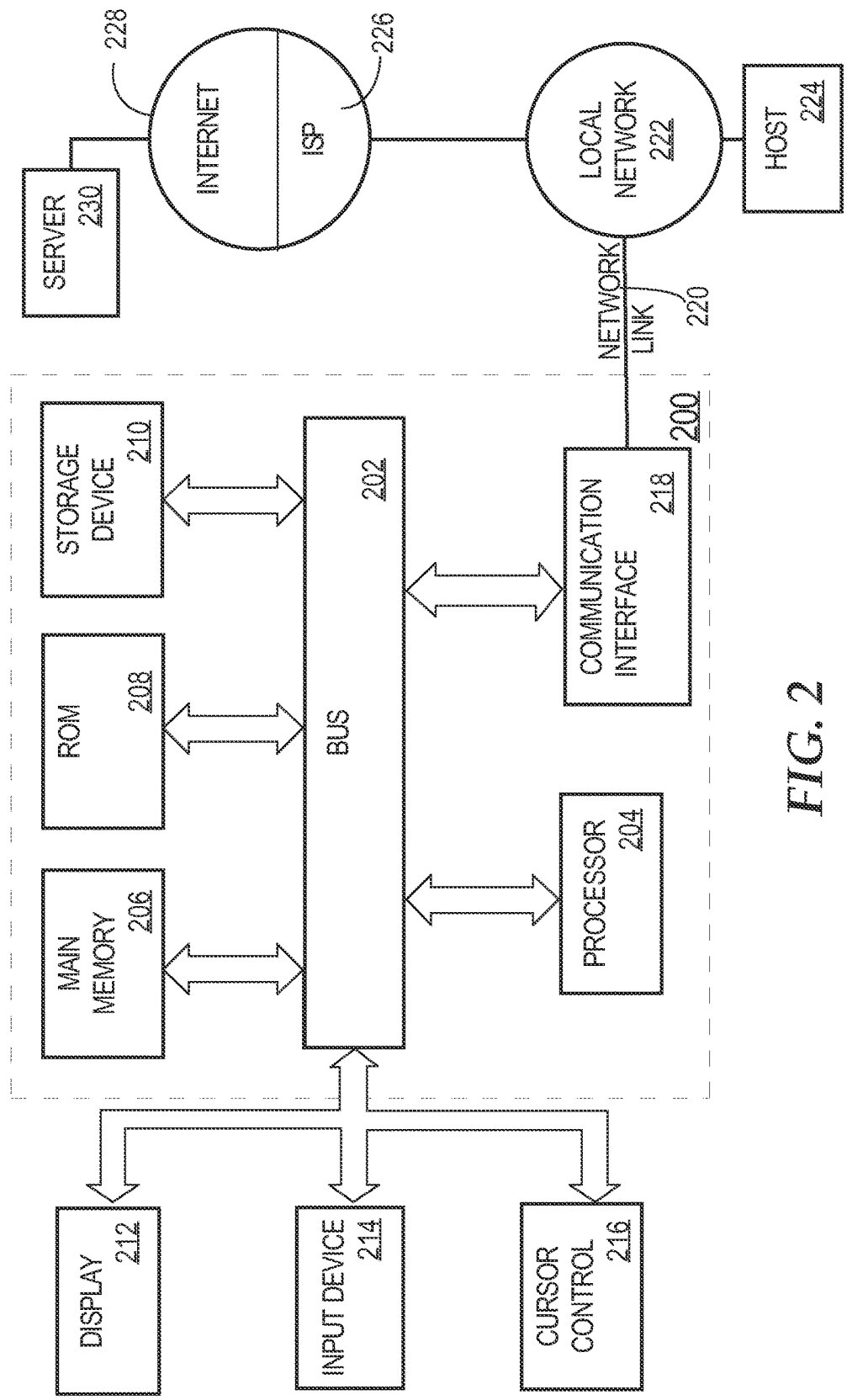
FIG. 2 illustrates a computer system upon which one or more embodiments may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a query comprising an extended group-by clause, the extended group-by clause comprising an extended group-by operator and a first set of group-by columns;
   wherein the query comprises one or more distinct aggregate functions and one or more non-distinct aggregate functions;
   constructing an initial subquery that generates a partially aggregated initial temporary (PAIT) table when executed, wherein the initial subquery comprises a GROUP BY clause that includes a second set of group-by columns comprising the first set of group-by columns of the extended group-by clause of the query and one or more columns specified by the one or more distinct aggregate functions;
   constructing one or more subqueries that compute groupings indicated by the extended group-by operator based on the PAIT table generated by the initial subquery;
   wherein the method is performed by one or more computing devices.

2. The method of claim 1, wherein the extended group-by operator is a GROUPING SETS operator or a CUBE operator.

3. The method of claim 1, wherein, when the query comprises one or more predicates specified in a WHERE clause, the initial subquery is constructed to generate the PAIT table such that the one or more predicates are applied as a filter.

4. The method of claim 1, further comprising:
   making a determination that the query comprises only a single distinct aggregate function;
   wherein, based on making the determination, the one or more subqueries are constructed to include an equivalent non-distinct aggregate function rather than the single distinct aggregate function.

5. The method of claim 1, wherein constructing the one or more subqueries comprises reducing the extended group-by clause to the one or more subqueries, wherein the one or more subqueries each comprise a simple GROUP BY clause with or without a ROLLUP operator.

6. The method of claim 5, further comprising:
   making a determination that none of the one or more subqueries can be calculated based on results of another of the one or more subqueries without using the PAIT table;
   wherein, based on making the determination, the query is executed by returning a union of results of the one or more subqueries without writing the results of the one or more subqueries to any additional temporary table.

7. The method of claim 1, further comprising:
   receiving a second query comprising a second extended group-by clause, the second extended group-by clause comprising a second extended group-by operator and a third set of group-by columns;
   making a determination that a FROM clause of the second query includes only a single table and does not require any joins or views, and that the second query does not comprise any predicates in a WHERE clause;
   in response to making the determination, constructing one or more second subqueries that compute the one or more distinct aggregate functions and the one or more non-distinct aggregate functions of the second query based on the single table;
   wherein no initial subquery to generate any PAIT table is constructed for the second query;
   responding to the second query based on the one or more second subqueries.

8. The method of claim 7, wherein constructing the one or more second subqueries comprises reducing the second extended group-by clause to the one or more second subqueries, wherein the one or more second subqueries each comprise a simple GROUP BY clause with or without a ROLLUP operator.

9. The method of claim 8, further comprising:
   making a determination that none of the one or more second subqueries can be calculated based on results of another of the one or more second subqueries without using the single table;
   wherein, based on making the determination, the query is executed by returning a union of results of the one or more second subqueries without writing the results of the one or more second subqueries to any additional temporary table.

10. A method comprising:
    receiving a query comprising a query block specifying an extended group-by clause comprising an extended group-by operator and a first set of group-by columns, wherein the query comprises one or more distinct aggregate functions that specify one or more columns and one or more non-distinct aggregate functions;

determining whether the query meets a first criterion that a FROM clause of the query includes only a single table and does not require any joins or views, and that the query does not comprise any predicates in a WHERE clause;

in response to determining that the query meets the first criterion, using the single table as an initial table;

in response to determining that the query does not meet the first criterion, constructing an initial subquery that generates a PAIT table when executed, wherein the initial subquery comprises a GROUP BY clause that includes a second set of group-by columns comprising the first set of group-by columns of the extended group-by clause and the one or more columns specified by the one or more distinct aggregate functions, wherein the PAIT table is used as the initial table;

constructing one or more subqueries that compute groupings indicated by the extended group-by operator based on the initial table;

wherein constructing the one or more subqueries comprises reducing the extended group-by clause to the one or more subqueries, wherein the one or more subqueries each comprise a simple GROUP BY clause with or without a ROLLUP operator;

responding to the query based on the one or more subqueries;

wherein the method is performed by one or more computing devices.

11. The method of claim 10, further comprising:

in response to determining that the query does not meet the first criterion, determining whether the query meets a second criterion that the query comprises only a single distinct aggregate function;

wherein, when the query does not meet the first criterion and meets the second criterion, the one or more subqueries are constructed to include an equivalent non-distinct aggregate function rather than the single distinct aggregate function.

12. The method of claim 10, further comprising:

determining whether the query meets a third criterion that none of the one or more subqueries can be calculated based on results of another of the one or more subqueries without using the initial table;

wherein, when the query meets the third criterion, the query is executed by returning a union of results of the one or more subqueries without writing the results of the one or more subqueries to any additional temporary table.

13. One or more non-transitory storage media storing instructions which, when executed by one or more computing devices, cause:

receiving a query comprising an extended group-by clause, the extended group-by clause comprising an extended group-by operator and a first set of group-by columns;

wherein the query comprises one or more distinct aggregate functions and one or more non-distinct aggregate functions;

constructing an initial subquery that generates a PAIT table when executed, wherein the initial subquery comprises a GROUP BY clause that includes a second set of group-by columns comprising the first set of group-by columns of the extended group-by clause of the query and one or more columns specified by the one or more distinct aggregate functions;

constructing one or more subqueries that compute groupings indicated by the extended group-by operator based on the PAIT table generated by the initial subquery.

14. The one or more non-transitory storage media of claim 13, wherein the extended group-by operator is a GROUPING SETS operator or a CUBE operator.

15. The one or more non-transitory storage media of claim 13, wherein the instructions further include instructions that, when executed by said one or more computing devices cause, when the query comprises one or more predicates specified in a WHERE clause, the initial subquery to be constructed to generate the PAIT table such that the one or more predicates are applied as a filter.

16. The one or more non-transitory storage media of claim 13, wherein the instructions include instructions that, when executed by said one or more computing devices, cause:

making a determination that the query comprises only a single distinct aggregate function;

wherein, based on making the determination, the one or more subqueries are constructed to include an equivalent non-distinct aggregate function rather than the single distinct aggregate function.

17. The one or more non-transitory storage media of claim 13, wherein constructing the one or more subqueries comprises reducing the extended group-by clause to the one or more subqueries, wherein the one or more subqueries each comprise a simple GROUP BY clause with or without a ROLLUP operator.

18. The one or more non-transitory storage media of claim 17, wherein the instructions include instructions that, when executed by said one or more computing devices, cause:

making a determination that none of the one or more subqueries can be calculated based on results of another of the one or more subqueries without using the PAIT table;

wherein, based on making the determination, the query is executed by returning a union of results of the one or more subqueries without writing the results of the one or more subqueries to any additional temporary table.

19. The one or more non-transitory storage media of claim 13, wherein the instructions include instructions that, when executed by said one or more computing devices, cause:

receiving a second query comprising a second extended group-by clause, the second extended group-by clause comprising a second extended group-by operator and a third set of group-by columns;

making a determination that a FROM clause of the second query includes only a single table and does not require any joins or views, and that the second query does not comprise any predicates in a WHERE clause;

in response to making the determination, constructing one or more second subqueries that compute the one or more distinct aggregate functions and the one or more non-distinct aggregate functions of the second query based on the single table;

wherein no initial subquery to generate any PAIT table is constructed for the second query;

responding to the second query based on the one or more second subqueries.

20. The one or more non-transitory storage media of claim 19, wherein constructing the one or more second subqueries comprises reducing the second extended group-by clause to the one or more second subqueries, wherein the one or more second subqueries each comprise a simple GROUP BY clause with or without a ROLLUP operator.

21. The one or more non-transitory storage media of claim 20, wherein the instructions further include instructions that, when executed by said one or more computing devices, cause:
    making a determination that none of the one or more second subqueries can be calculated based on results of another of the one or more second subqueries without using the single table;
    wherein, based on making the determination, the query is executed by returning a union of results of the one or more second subqueries without writing the results of the one or more second subqueries to any additional temporary table.

22. One or more non-transitory storage media storing instructions which, when executed by one or more computing devices, cause:
    receiving a query comprising a query block specifying an extended group-by clause comprising an extended group-by operator and a first set of group-by columns, wherein the query comprises one or more distinct aggregate functions that specify one or more columns and one or more non-distinct aggregate functions;
    determining whether the query meets a first criterion that a FROM clause of the query includes only a single table and does not require any joins or views, and that the query does not comprise any predicates in a WHERE clause;
    in response to determining that the query meets the first criterion, using the single table as an initial table;
    in response to determining that the query does not meet the first criterion, constructing an initial subquery that generates a PAIT table when executed, wherein the initial subquery comprises a GROUP BY clause that includes a second set of group-by columns comprising the first set of group-by columns of the extended group-by clause and the one or more columns specified by the one or more distinct aggregate functions, wherein the PAIT table is used as the initial table;
    constructing one or more subqueries that compute groupings indicated by the extended group-by operator based on the initial table; and
    wherein constructing the one or more subqueries comprises reducing the extended group-by clause to the one or more subqueries, wherein the one or more subqueries each comprise a simple GROUP BY clause with or without a ROLLUP operator;
    responding to the query based on the one or more subqueries.

23. The one or more non-transitory storage media of claim 22, wherein the instructions include instructions that, when executed by said one or more computing devices, cause:
    in response to determining that the query does not meet the first criterion, determining whether the query meets a second criterion that the query comprises only a single distinct aggregate function;
    wherein, when the query does not meet the first criterion and meets the second criterion, the one or more subqueries are constructed to include an equivalent non-distinct aggregate function rather than the single distinct aggregate function.

24. The one or more non-transitory storage media of claim 22, the instructions include instructions that, when executed by said one or more computing devices, cause:
    determining whether the query meets a third criterion that none of the one or more subqueries can be calculated based on results of another of the one or more subqueries without using the initial table;
    wherein, when the query meets the third criterion, the query is executed by returning a union of results of the one or more subqueries without writing the results of the one or more subqueries to any additional temporary table.

* * * * *